United States Patent
Hayes et al.

(10) Patent No.: US 6,657,769 B2
(45) Date of Patent: Dec. 2, 2003

(54) LOW VOLTAGE, OPTICAL PHASE MODULATOR

(75) Inventors: Robert R. Hayes, Calabasas, CA (US);
Alan R. Kost, Tucson, AZ (US);
Daniel Yap, Thousand Oaks, CA (US);
Thomas R. Cooper, Torrance, CA (US)

(73) Assignee: The Boeing Company, Seattle, WA (US)

( * ) Notice: Subject to any disclaimer, the term of this patent is extended or adjusted under 35 U.S.C. 154(b) by 82 days.

(21) Appl. No.: 09/933,255

(22) Filed: Aug. 20, 2001

(65) Prior Publication Data

US 2003/0189747 A1 Oct. 9, 2003

(51) Int. Cl.$^7$ .............................................. G02B 6/10
(52) U.S. Cl. ........................................ 359/279; 385/3
(58) Field of Search ............................... 359/279, 245; 385/3

(56) References Cited

U.S. PATENT DOCUMENTS 5,184,243 A * 2/1993 Henmi et al. ............... 359/181
6,192,167 B1 * 2/2001 Kissa et al. ..................... 385/3

OTHER PUBLICATIONS

Phase Shift Keying Using Optical Delay Modulation for Millimeter–Wave Fiber Optic Radio Links—Journal of Lightwave Technology, vol. 18, No. 3, Mar. 2000.

* cited by examiner

Primary Examiner—Scott J. Sugarman
Assistant Examiner—Richard Hanig
(74) Attorney, Agent, or Firm—Terje Gudmestad

(57) ABSTRACT

A low voltage optical phase modulator includes a splitter having an input, a first output, and a second output. The input receives an optical signal and is split between the first and second outputs. A phase adjustment element is coupled to the second output and produces a predetermined optical shift in the optical signal to produce a phase-shifted optical signal. A first electroabsorptive element is coupled to the first output and blocks transmission of the optical signal when the first electroabsorptive element is activated with a low voltage. A second electroabsorptive element is coupled to the phase adjustment element and blocks transmission of the phase-shifted optical signal when the second electroabsorptive element is activated using the low voltage. An optical combiner having a first combiner input, a second combiner input, and a combiner output is coupled to the first and second electroabsorptive elements and receives the optical signal and the phase-shifted optical signal. The combiner combines these optical signals to produce a binary encoded optical signal. The present invention thus achieves an improved low voltage optical phase modulator. The present invention is advantageous in that substantially larger than 180 degrees phase shift can be achieved with the same low voltage by using optical paths having longer lengths.

16 Claims, 1 Drawing Sheet

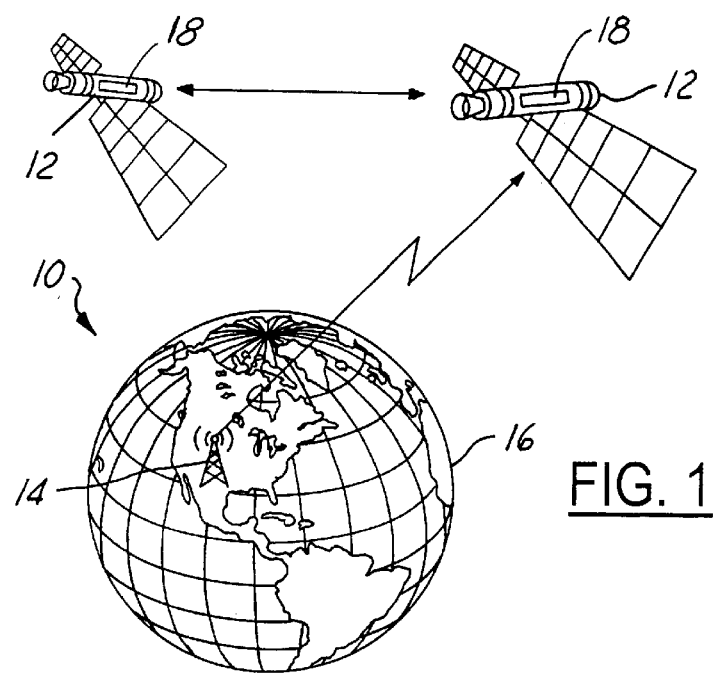
FIG. 1
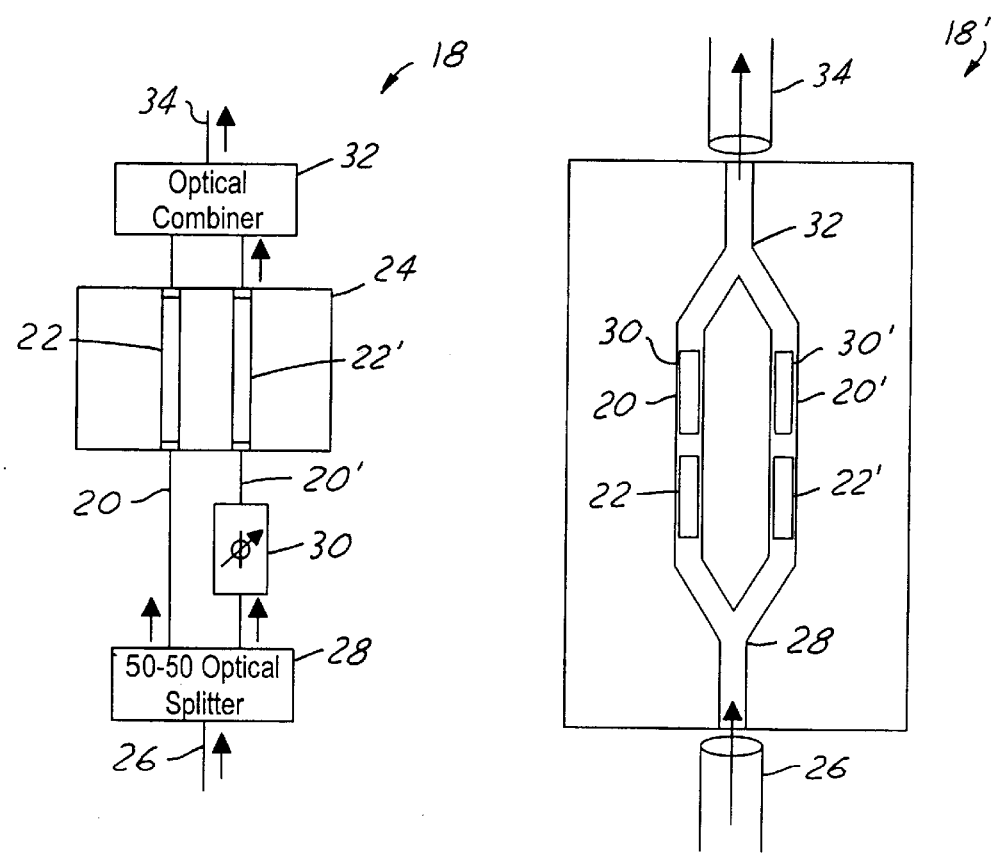
FIG. 2
FIG. 3

LOW VOLTAGE, OPTICAL PHASE MODULATOR

TECHNICAL FIELD

The present invention relates generally to satellite communication systems, and more particularly, to a low voltage optical phase modulator.

BACKGROUND ART

Satellites and other spacecraft are in widespread use for various purposes including scientific research and communications. Many of these missions, however, cannot be fulfilled without high bandwidth wireless communication. In many applications, such as business information-exchange satellite systems, the satellite relies upon wireless communication to send and to receive huge amounts of electronic data at very high data rates. Without high bandwidth wireless communication, proper satellite function is hindered and at times adversely effected. Additionally, while these communication systems are well suited for satellite use, they may also be used in other terrestrial applications.

Optical intersatellite laser communication or LASER-COM systems using a digital phase shift key data format require an optical phase modulator capable of achieving a 180 degree phase shift with as small a switching voltage as is technically feasible. LiNbO$_3$ modulators have been developed with switching voltages V$_\pi$ that are approximately six volts in order to produce a 180 degree phase shift. Unfortunately, this voltage is not as low as would be desired.

For compatibility with space qualifiable electronics and to achieve the required bandwidth at higher data rates, switching of two volts or less is required. Because such a low voltage is difficult to achieve using LiNbO$_3$ technology, alternative technologies have been examined. A disadvantage of most prior art technologies is that a relatively high input voltage swing is needed to produce the desired phase shifts. LiNbO$_3$ phase shifters with a V$\pi$ of about three volts have been demonstrated in laboratory settings. Also, prior implementations have only been concerned with producing phase shifts of millimeter wavelength carriers.

Optical phase shifters using GaAs for the electrooptical material are also commercially available. V$\pi$ for these devices is about five volts to achieve a 180 degree phase shift. Phase shifters using electrorefraction in semiconductor quantum wells at wavelengths near the optical absorption edge have been demonstrated with a V$\pi$ of several volts. Unfortunately, these devices suffer from having high attenuation from the large background absorption.

The disadvantages associated with these conventional optical-phase modulation techniques have made it apparent that a new technique for modulation is needed. The new technique should allow optical-phase modulation at a large bandwidth parenthetically greater than 20 GHz but require a voltage swing of less than two volts. Additionally, the new technology should allow superior reliability and performance. The present invention is directed to these ends.

SUMMARY OF THE INVENTION

It is, therefore, an object of this invention to provide an improved and reliable low voltage optical phase modulator. Another object of the invention is to allow bandwidth operation of greater than 20 GHz while requiring a voltage swing of less than two volts.

In accordance with the objects of this invention, a low voltage optical phase modulator system is provided. In one embodiment of the invention, a low voltage optical phase modulator includes a splitter having an input, a first output, and a second output. The input receives an optical signal and is split between the first and second outputs. A phase adjustment element is coupled to the second output and produces a predetermined optical shift in the optical signal to produce a phase-shifted optical signal. A first electroabsorptive element is coupled to the first output and blocks transmission of the optical signal when the first electroabsorptive element is activated with a low voltage. A second electroabsorptive element is coupled to the phase adjustment element and blocks transmission of the phase-shifted optical signal when the second electroabsorptive element is activated using the low voltage. An optical combiner having a first combiner input, a second combiner input, and a combiner output is coupled to the first and second electroabsorptive elements and receives the optical signal and the phase-shifted optical signal. The combiner combines these optical signals to produce a binary encoded optical signal.

The present invention thus achieves an improved low voltage optical phase modulator. The present invention is advantageous in that substantially larger than 180 degrees phase shift can be achieved with the same low voltage by using optical paths having longer lengths.

Additional advantages and features of the present invention will become apparent from the description that follows and may be realized by means of the instrumentalities and combinations particularly pointed out in the appended claims taken in conjunction with the accompanying drawings.

BRIEF DESCRIPTION OF THE DRAWINGS

In order that the invention may be well understood, there will now be described some embodiments thereof taken by way of example, reference being made to the accompanying drawings in which:

FIG. 1 is a perspective view of a satellite system having a low voltage optical phase modulator in accordance with one embodiment of the present invention;

FIG. 2 is a block diagram of a low voltage optical phase modulator in accordance with one embodiment of the present invention; and FIG. 3 is a block diagram of a monolithically integrated phase shifter in accordance with one embodiment of the present invention.

BEST MODES FOR CARRYING OUT THE INVENTION

In the following Figures, the same reference numerals will be used to identify identical components of the various views. The present invention is illustrated with respect to a low voltage optical phase modulator particularly suited for the aerospace field. However, the present invention is applicable to various and other uses that may require low voltage optical phase modulators.

Referring to FIG. 1, a perspective view of a satellite system 10 is comprised of several satellites 12 in communication with a ground station 14 located on the Earth 16 and with each other. Satellite 12 rely upon high bandwidth optical communications to send and receive large amounts of data at very high data rates. Each of the satellite 12 may contain one or more low voltage optical phase modulators 18 to produce binary optical signals or digitally phase shift keyed optical signals.

Referring to FIG. 2, a block diagram of a low voltage optical phase modulator 18 in accordance with one embodiment of the present invention is illustrated. Low voltage optical phase modulator 18 makes use of switching between two or more optical paths 20 to change the phase of an optical signal. Path switching is achieved with semiconductor electroabsorption modulators 22. The effective $V_\pi$ for the phase modulator 18 is the switching voltage of the electroabsorption modulators 22, i.e. two volts or less. The switching speed can be at least 20 Gigabit per second, limited by the bandwidth of the electroabsorption modulators 22. The configuration pictured in FIG. 2 uses a pair of electroabsorption modulators 22 monolithically integrated on a semiconductor chip 24 and additional discrete optical components to produce a binary phase shifter. Shifting between more than two phase values can be achieved using additional components. A fully integrated phase modulator on a single semiconductor chip will be described.

The unencoded optical input 26 as pictured in FIG. 2 comes from an optical fiber. One skilled in the art, however, would realize that the present invention could also be modified for phase shifting of free space optical beams. The optical input is split in two by a optical splitter 28 and launched into separate device arms: Arm One 20' and Arm Two 20. The power splitting is approximately 50/50 with the precise value chosen to compensate for different amounts of optical attenuation in the arms. The light propagating in Arm One 20' passes through a phase adjuster 30. The phase for this optical signal is shifted using an electro-optical crystal. The purpose of this adjustment is to insure that light from the two arms are 180 degrees out of phase at the point where they are recombined. For this illustration, light passing through Arm Two 20 is made to be 180 degrees ahead of light passing through Arm One 20'. One skilled in the art, however, would realize that design factors would allow any desired phase shift to be chosen. Furthermore, the optical input can be split into more than two arms to obtain a larger number of selectable phase shifts. The phase adjuster 30 need not have large electrical bandwidth. A few kHz is reasonable so long as the adjuster 30 can compensate for environmental perturbations to the optical path. Each of the arms passes through an electroabsorptive-type semiconductor switch 22. The electroabsorption switches 22 are the heart of the device, determining the required voltage swing and electrical bandwidth. In normal operation, one switch is on and the other is off so that the light gets transmitted through one and only one of the two device arms. Light in the untransmitted arm is absorbed by the switch.

All semiconductor electroabsorption-type modulators consist of electroabsorbing materials (e.g. InGaAs/InAlAs or InGaAsP) sandwiched between light guiding layers. Material composition and layer thicknesses are chosen so that the optical wavelength is just longer than the absorption edge of the electroabsorber. When a voltage is applied, the absorption edge shifts to longer wavelengths and the light passing through the modulator is absorbed. The electroabsorptive effect in semiconductor quantum wells is known as the Quantum-Confined Stark Effect.

After being combined by optical combiner 32, the light has a phase shift relative to the input as a result of propagating through the device. The total phase shift is delta for the light from Arm One 20' or delta plus 180 degrees if transmitted light came from Arm Two 20. At this point, the phase-shifted light leaves the device, reentering an optical fiber 34. The voltage required to switch the electroabsorptive optical modulators is crucial because it is the effective $V_\pi$ for the phase modulator. Using semiconductor quantum wells for the electroabsorptive material, the switching voltage can be kept to two volts or less. The bandwidth of the phase shifter is eliminated by the capacitance of the electroabsorptive modulator 22 and the output resistance of its drive circuitry. Very high speed electroabsorptive-type optical modulators have been demonstrated with bandwidths up to 50 GHz.

Referring now to FIG. 3, a block diagram of a monolithically integrated phase shifter 18' in accordance with the present invention is illustrated. The monolithically integrated phase shifter 18' performs the same function as the phase shifter 18 described in FIG. 2. The primary difference is that all components are implemented using processed semiconductor material. This implementation has a potential to reduce device size and manufacturing costs. For some phase encoding schemes such as digital phase shift keying, the amount of phase shift is quite small, i.e. a fraction of an optical wavelength. Such small phase shifts correspond to a difference in path of only a few micrometers. The path lengths can be set during the device design and fabricated by appropriate design of the fabrication masks and appropriate control of the fabrication process. However, some fine tuning of the relative phase shift may be necessary. A pair of phase adjusters 30 and 30' perform this function.

A particularly good component for phase adjustment is a semiconductor optical amplifier. An amplifier is a forward biased device, so it must be electrically isolated from an electroabsorptive segment which is reverse biased. The phase of light passing through an optical amplifier can be adjusted by changing the current to the amplifier. Large changes in refractive index in an amplifier arise from current injection by free carrier effects and modifications to the gain spectrum.

An optical amplifier also can provide gain to compensate for optical loss from imperfect optical coupling into the device, background absorption in the electroabsorption modulators or other effects. Each amplifier compensates for the optical loss in each arm.

From the foregoing, it can be seen that there has been brought to the art a new and improved low voltage optical phase modulator. It is to be understood that the preceding description of the preferred embodiment is merely illustrative of some of the many specific embodiments that represent applications of the principles of the present invention. Clearly, numerous and other arrangements would be evident to those skilled in the art without departing from the scope of the invention as defined by the following claims.

What is claimed is:

1. A low voltage optical phase modulator comprising:
a splitter having an input, at least a first output, and a second output, said input receiving an optical signal on an optical carrier wherein said splitter splits said optical signal to both said first and second outputs;
a phase adjustment element coupled to said output, said phase adjustment element producing a predetermined optical phase shift in said optical signal that is a fraction in length of an optical wavelength of said optical carrier to produce a phase shifted optical signal;
a first electroabsorptive element coupled to said output, said first electroabsorptive element blocking transmission of said optical signal when said first electroabsorptive element is activated using a low voltage;
a second electroabsorptive element coupled to said phase adjustment element, said second electroabsorptive element blocking transmission of said phase shifted optical signal when said second electroabsorptive element is activated using said low voltage; and
an optical combiner having a first combiner input, a second combiner input, and a combiner output, said first combiner input coupled to said first electroabsorptive element and receiving said optical signal, said second combiner input coupled to said second electroabsorptive element and receiving said phase shifted optical signal wherein said optical combiner combines said optical signal and said phase-shifted optical signal to produce a binary encoded optical signal.

2. The low voltage optical phase modulator as recited in claim 1, wherein said first electroabsorptive element is a first semiconductor electroabsorbtion modulator.

3. The low voltage optical phase modulator as recited in claim 1, wherein said second electroabsorptive element is a second semiconductor electroabsorbtion modulator.

4. The low voltage optical phase modulator as recited in claim 1, wherein said low voltage is a voltage below two volts.

5. The low voltage optical phase modulator as recited in claim 1, wherein said predetermined optical phase shift is determined by the following equation: 360° divided by the number of outputs of the splitter approximately 180 degrees.

6. The low voltage optical phase modulator as recited in claim 1, further comprising a phase maintenance element between said phase adjustment element and said second electroabsorptive element, whereby said phase maintenance element maintains said predetermined optical phase shift in the presence of environmental pertubations.

7. The low voltage optical phase modulator as recited in claim 6, wherein said phase maintenance element is an electro-optic modulator.

8. The low voltage optical phase modulator as recited in claim 6, wherein said phase maintenance element is a semiconductor optical amplifier.

9. A satellite system comprising:
a first satellite in orbit and in communication with a second satellite, said first satellite having a low voltage optical phase modulator comprising:
  a splitter having an input, at least a first output, and a second output, said input receiving an optical signal on an optical carrier wherein said splitter splits said optical signal to both said first and second outputs;
  a phase adjustment element coupled to said output, said phase adjustment element producing a predetermined optical phase shift in said optical signal that is a fraction in length of an optical wavelength of said optical carrier to produce a phase shifted optical signal;
  a first electroabsorptive element coupled to said output, said first electroabsorptive element blocking transmission of said optical signal when said first electroabsorptive element is activated using a low voltage;
  a second electroabsorptive element coupled to said phase adjustment element, said second electroabsorptive element blocking transmission of said phase shifted optical signal when said second electroabsorptive element is activated using said low voltage; and
  an optical combiner having a first combiner input, a second combiner input, and a combiner output, said first combiner input coupled to said first electroabsorptive element and receiving said optical signal, said second combiner input coupled to said second electroabsorptive element and receiving said phase shifted optical signal wherein said optical combiner combines said optical signal and said phase-shifted optical signal to produce a binary encoded optical signal.

10. The satellite system as recited in claim 9, wherein said first electroabsorptive element is a first semiconductor electroabsorbtion modulator.

11. The satellite system as recited in claim 9, wherein said second electroabsorptive element is a second semiconductor electroabsorbtion modulator.

12. The satellite system as recited in claim 9, wherein said low voltage is a voltage below two volts.

13. The satellite system as recited in claim 9, wherein said predetermined optical phase shift is approximately 180 degrees.

14. The satellite system as recited in claim 9, further comprising a phase maintenance element between said phase adjustment element and said second electroabsorptive element, whereby said phase maintenance element maintains said predetermined optical phase shift in the presence of environmental pertubations.

15. The satellite system as recited in claim 14, wherein said phase maintenance element is an electro-optic modulator.

16. The satellite system as recited in claim 14, wherein said phase maintenance element is a semiconductor optical amplifier.

* * * * *